Nov. 1, 1932.  M. B. SALISBURY  1,885,951

PROCESS OF MAKING RUBBER SLEEVES

Filed Feb. 24, 1931

Inventor
Moses B. Salisbury
By Zabel & Banning
Attys.

Patented Nov. 1, 1932

1,885,951

UNITED STATES PATENT OFFICE

MOSES B. SALISBURY, OF CHICAGO, ILLINOIS

PROCESS OF MAKING RUBBER SLEEVES

Application filed February 24, 1931. Serial No. 517,746.

My invention relates to rubber sleeves, such as are used by linemen working along electric lines, to avoid receiving shocks.

These sleeves are usually slip-on affairs which may be connected together over the shoulders in such a fashion as to hold them in place. In order for them to conform somewhat to the arm, they are made tapering from one end to the other and somewhat longer on one side where they go over the shoulder than on the opposite side where they fit underneath the arm.

To be efficient as an insulating device, they are preferably made of all rubber without the use of any fastening devices that might provide a path through the rubber for the electrical current.

It is also essential that they be of very light uniform quality as the weight is of great importance to the user.

Owing to the tapering and unusual form of the article, the moulding of it in the finished form is of doubtful utility for the purpose. This is owing to the fact that to have the mold closing under the normal pressure required upon a form of such an odd shape practically precludes uniform thickness in the product.

One of the purposes of this invention is to provide a method whereby the articles may be moulded under the requisite pressure and still combine into the final form without the loss of strength or insulating quality.

It is also a purpose of this invention to provide a sleeve of this character of substantially uniform thickness and strength throughout its surface.

In order to aid in understanding the invention, I will refer to the accompanying drawing wherein—

Figure 1:
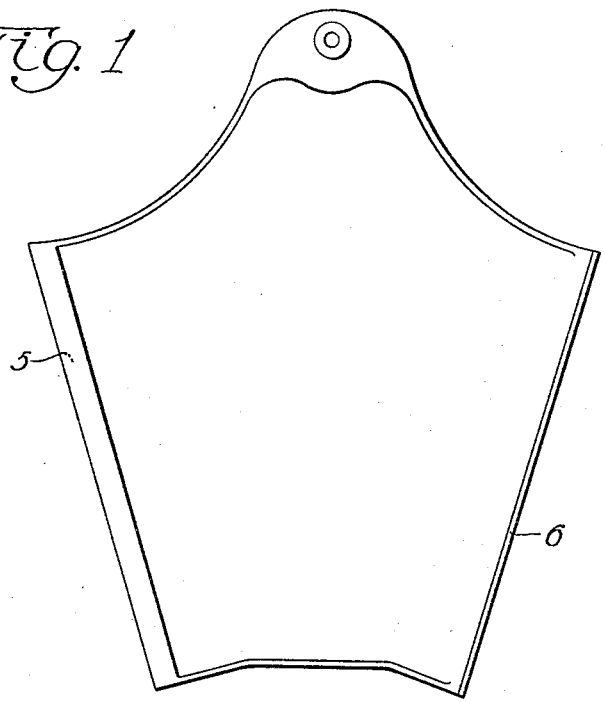
Fig. 1 is a plan view of the moulded blank prior to its being formed in the sleeve shape.

In carrying out the invention, I preferably take the raw material, namely rubber, calender it to proper thickness, cut it to shape, and place it in a mould which is flat and substantially the contour of Fig. 1. The pressure is then applied to the material, and this pressure is in the neighborhood of 200 tons over the area; however, since the mould itself is flat, no difficulties are encountered in applying the pressure evenly over the surface and retaining the resulting product of substantially uniform thickness.

Figure 2:
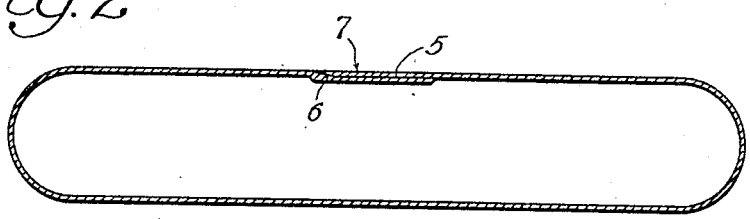
Fig. 2 is a cross section of the blank in one stage of the operation.
Figure 3:
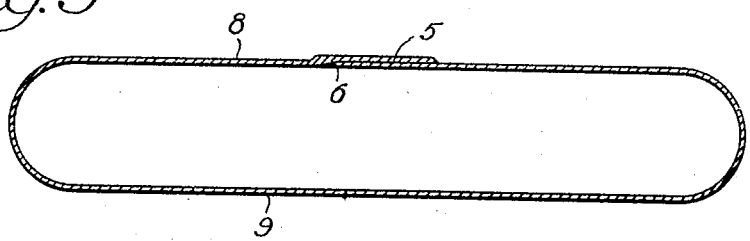
Fig. 3 is a cross section of the blank in the final stage.

Having placed the material in the mould and applied pressure, it is then vulcanized while under the same pressure. The seam portion indicated at 5 in the drawing is roughened by a rotary buffer and a cement in liquid form consisting of rubber of the same material as the sleeve and a solvent is applied to both edges 5 and 6. The article is then hung up and allowed to dry. Then the two edges 5 and 6 are overlapped as shown at 7 in Fig. 2 and slightly pressed into contact by a hand roller. Immediately after this is done, the sleeve is turned inside out and placed in a hot press with a cloth separator between the top portion 8 and the bottom portion 9, and kept therein at low pressure for say two minutes in order to cure the seam.

Thus it will be seen that I have provided a method of making a sleeve which avoids the necessity of providing or attempting the use of moulds for making the tubular article which moulds would have to close on the unsymmetrical form taken by the completed article.

Having thus described the invention, what I claim as new and desire to secure by Letters Patent is:

1. A method of forming rubber sleeves for covering and insulating the arms of workers which comprises molding the rubber under a very high pressure into a flat blank of substantially uniform thickness and shape so that when the side edges are joined the tubular member so formed will make a tapering sleeve, removing the blank from the mold, applying rubber cement to the side edges of the blank drying the cement, and overlapping and pressing them together turning the sleeve thus formed inside out, and applying heat and a low pressure thereto to complete the bond between the edges.

2. The method of forming a tubular molded rubber member which because of its shape cannot readily be molded of uniform thickness in final form which consists in molding at high pressure a flat blank of uniform thickness and an offset side edge cementing the side edges with rubber cement drying the same, overlapping the side edges to the extent of the offset, inverting the member and curing the seam by the application of heat at a low pressure.

In witness whereof, I hereunto subscribe my name this 10th day of February A. D., 1931.

MOSES B. SALISBURY.